United States Patent
Mondal et al.

(10) Patent No.: US 8,516,360 B2
(45) Date of Patent: Aug. 20, 2013

(54) CONTROLLED PARALLEL COMPILATION AND EXECUTION OF JAVASCRIPTS

(75) Inventors: Shyama Prasad Mondal, San Diego, CA (US); Subrato K. De, San Diego, CA (US); Dineel D. Sule, San Diego, CA (US); Mark Bapst, South Barrington, IL (US); Tarun Nainani, San Diego, CA (US)

(73) Assignee: Qualcomm Innovation Center, Inc., San Diego, CA (US)

( * ) Notice: Subject to any disclaimer, the term of this patent is extended or adjusted under 35 U.S.C. 154(b) by 61 days.

(21) Appl. No.: 13/216,780

(22) Filed: Aug. 24, 2011

(65) Prior Publication Data

US 2013/0055063 A1 Feb. 28, 2013

(51) Int. Cl.
*G06F 17/00* (2006.01)

(52) U.S. Cl.
USPC .................... 715/234; 717/149; 717/119

(58) Field of Classification Search
USPC ............... 715/234, 235–237, 736–738, 748; 717/115, 119, 149, 156
See application file for complete search history.

(56) References Cited

U.S. PATENT DOCUMENTS

| | | | | |
|---|---|---|---|---|
| 8,176,321 B1 * | 5/2012 | Perry et al. | | 713/167 |
| 8,285,813 B1 * | 10/2012 | Colton et al. | | 709/217 |
| 2011/0282940 A1 * | 11/2011 | Zhang et al. | | 709/204 |
| 2012/0159311 A1 | 6/2012 | Hanssen et al. | | |
| 2012/0226738 A1 * | 9/2012 | Taneja et al. | | 709/203 |

OTHER PUBLICATIONS

Asaduzzaman, A., et al., "Evaluation of Application-Specific Multi-processor Mobile System", "SPECS'04", 2004, p. 8, Publisher: Int'l Symp. on Performance Evaluation of Computer and Telecomm. Sys., Published in: US.
Shpeisman, Tatiana, "River Trail: Parallel Web Applications", "Webpage downloaded", Oct. 6, 2011, Publisher: Intel.
Jones, C.G., et al., "Parallelizing the Web Browser", "Conference Paper, HotPar'09", Mar. 2009, p. 6, Publisher: UC Berkeley, Published in: US.
Meyerovich, L., et al., "Secure Cooperative Sharing of JavaScript, Browser, and Physical Resources", "Proceedings of the Workshop on Web 2.0 Security and Privacy", May 2010, p. 5, Publisher: UC Berkeley; Microsoft Research, Published in: US.
Meyerovich, L., et al., "Fast and Parallel Webpage Layout", 2010, p. 10, Publisher: UC Berkeley, Published in: US.
Meyerovich, L. et al., "Parallel Webpage Layout", , p. 24, Publisher: UC Berkeley, Published in: US.
NVIDIA, "The Benefits of Multiple CPU Cores in Mobile Devices", 2010, p. 23, Publisher: NVIDIA Corporation, Published in: US.

* cited by examiner

*Primary Examiner* — Cesar Paula
*Assistant Examiner* — Quoc A Tran
(74) *Attorney, Agent, or Firm* — Neugeboren O'Dowd PC

(57) ABSTRACT

A computing device comprising an application utilizing content comprising a plurality of JavaScripts, wherein the computing device compiles and executes a first of the plurality of JavaScripts substantially simultaneously as compiling and executing a second of the plurality of JavaScripts.

28 Claims, 5 Drawing Sheets

CONTROLLED PARALLEL COMPILATION AND EXECUTION OF JAVASCRIPTS

BACKGROUND OF THE INVENTION

1. Field of the Invention

This invention is related to application performance on a computing device. Specifically, but not intended to limit the invention, embodiments of the invention are related to parallel compilation and execution of JavaScripts in a web browser on a computing device.

2. Relevant Background

JavaScripts are often sequentially compiled and executed by JS engines such as, but not limited to, JIT-based JS engines, one by one as they appear in the file containing the JavaScript source code. For example, web browsers and a rendering engine (i.e., WebKit) may sequentially compile and execute JavaScripts in the order they appear in a base-level web page object—such as, but not limited to, a HTML file. Whenever the browser/WebKit finds a JavaScript while the HTML document is being parsed, the browser/WebKit may pass the JavaScript to the JS Engine (i.e., V8) and await the completion of compilation and execution of the JavaScript before the browser/WebKit sends the next-encountered JavaScript to JS Engine for similar processing.

Even though there may be mechanisms that allow a HTML parser to continue to download resources (such as, but not limited to JavaScripts, CSS objects, and images) during JavaScript processing, the processing of a web page is inherently a sequential lazy-evaluation of JavaScripts in web pages. This sequential processing delays HTML download, parsing and overall page loading performance. This sequential processing delay is especially noticeable for websites where a JavaScript calls another JavaScript which calls another JavaScript and so forth. Such dependency trees are becoming increasingly common, and in such embodiments, the download, then compile, then execution of a first JavaScript in the dependency tree blocks the downloading of the second JavaScript in the tree, which blocks the downloading of the third JavaScript . . . and so on.

Evaluation of JavaScripts forms a substantial part of a browser's overall page load time. Without considering networking delays, the amount of time spent processing and evaluating JavaScripts may comprise about 30% of a total a page load time when first requesting a website with a nominal amount of JavaScripts. In one traditional function-based JIT JavaScript engine, the 30% may be further partitioned into about 10% for compilation and about 20% for execution of the JavaScript.

Many limitations in JavaScript processing may be due to features such as, but not limited to, a complex inter-dependency of the JavaScripts files, JavaScripts closure feature, global variables that may be defined in various locations (i.e. anywhere), and access of share components outside the JavaScript engine that may be modifiable through a JavaScript—like a shared DOM (Document Object Model). Limitations may also be due to events that may result in a subset of JavaScripts to be evaluated (compiled & executed). It is beyond the means of current JavaScript evaluators (compilers and executors) to manage such complex interdependencies, shared DOM resources, and subsequent events that may result in subsequent JavaScript evaluation in determining an order of JavaScript evaluation. Therefore, although a non-sequential JavaScript evaluation process may lead to quicker web-page processing, current JavaScript evaluators are unable to utilize non-sequential JavaScript processing.

Furthermore, although the HTML5 <worker> tag may be used to specify that a JavaScript can be executed asynchronously on a separate thread, the tag can only be used for HTML5 implementations and oftentimes may not used by website developers. Even if it is supported by a browser that supports handling the <worker> tag, if the website doesn't use the <worker> tag, then the browser can't run JavaScripts on separate threads. Additionally, since a thread established from a <worker> tag is generally used for running a compute intensive JavaScript snippet that doesn't modify a DOM, it may not be able to handle any arbitrary JavaScript code found in a web page.

SUMMARY OF THE INVENTION

Illustrative embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents, and alternative constructions that fall within the spirit and scope of the invention as expressed in the claims.

Embodiments of the invention comprise simultaneously processing (compiling and executing) multiple JavaScripts which may belong to a single web-page, during the download of the JavaScripts with a preload scanner, thereby decreasing a web page load time and improving the web browsing experience, among the user experience of other applications utilizing JavaScripts. Embodiments may be used for pre-HTML5 versions, and HTML5 versions with the <worker> tag.

One embodiment of the invention comprises a computing device comprising an application utilizing content comprising a plurality of JavaScripts. One computing device is adapted to one of compile and execute a first of the plurality of JavaScripts substantially simultaneously as compiling and executing a second of the plurality of JavaScripts.

Another embodiment of the invention comprises a method of processing web page content. One method comprises setting a resource-loading preference for one or more types of web page content. The method further comprises identifying one or more portions of the web page content that can be processed in-parallel without either modification of a shared Document Object Model or initiating one or more web page content event dependencies. The method also comprises compiling at least a part of the one or more portions of the web page content in-parallel and executing at least a part of the one or more portions of the web page content in-parallel.

Yet another embodiment of the invention comprises a computing system. One computing system comprises means for a computing device to request external JavaScripts in-parallel, irrespective of whether the external JavaScripts are dependent on another JavaScript. The computing system may further comprise means for compiling the JavaScripts in-parallel and means for executing the JavaScripts in-parallel.

And yet another embodiment of the invention comprises a non-transitory, tangible computer readable storage medium, encoded with processor readable instructions to perform a method of displaying a web page on an electronic display. One embodiment comprises requesting to view a HTML file via a web browser, with the HTML file comprising one or more JavaScripts and a plurality of additional objects. The method may further comprise parsing the HTML file and preferentially requesting to receive the one or more JavaScripts prior to requesting to receive at least a portion of the plurality of additional objects. Additionally, the method comprises compiling at least a portion of at least two of the one or more JavaScripts in-parallel and executing at least a portion of at least two of the one or more JavaScripts in-parallel. Finally, the method comprises displaying the web page on the electronic display.

BRIEF DESCRIPTION ON THE DRAWINGS

DETAILED DESCRIPTION

Figure 1:
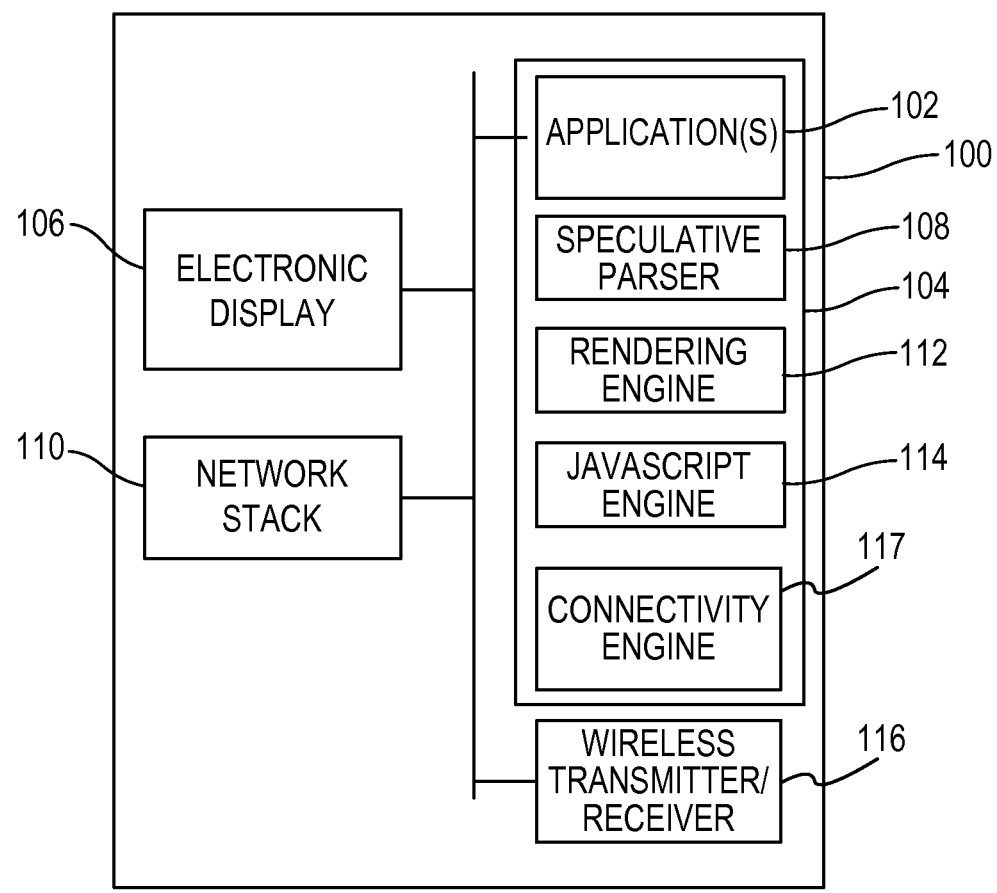
FIG. 1 illustrates a block diagram depicting physical and non-physical components.

Looking first at FIG. 1, seen is a computing device 100 comprising one or more applications 102. One computing device 100 may comprise a mobile computing device, and it is contemplated that throughout the application, the embodiments described herein may refer to mobile embodiments, where appropriate, although the embodiments may not specifically refer to a mobile embodiment. The one or more applications 102 may be stored on computing device memory components 104. The one or more applications 102 may individually, or together, utilize content comprising a plurality of JavaScripts. For example, one of the one or more applications 102 may comprise a web browser adapted to display, on an electronic display 106, a website comprising a plurality of JavaScripts and additional website objects. However, it is also contemplated that the one or more applications 102 may comprise other applications besides a web browser that may utilize JavaScripts. In one embodiment, at least a portion of the plurality of JavaScripts comprising the website are at least one of compiled and executed simultaneously.

Figure 2:
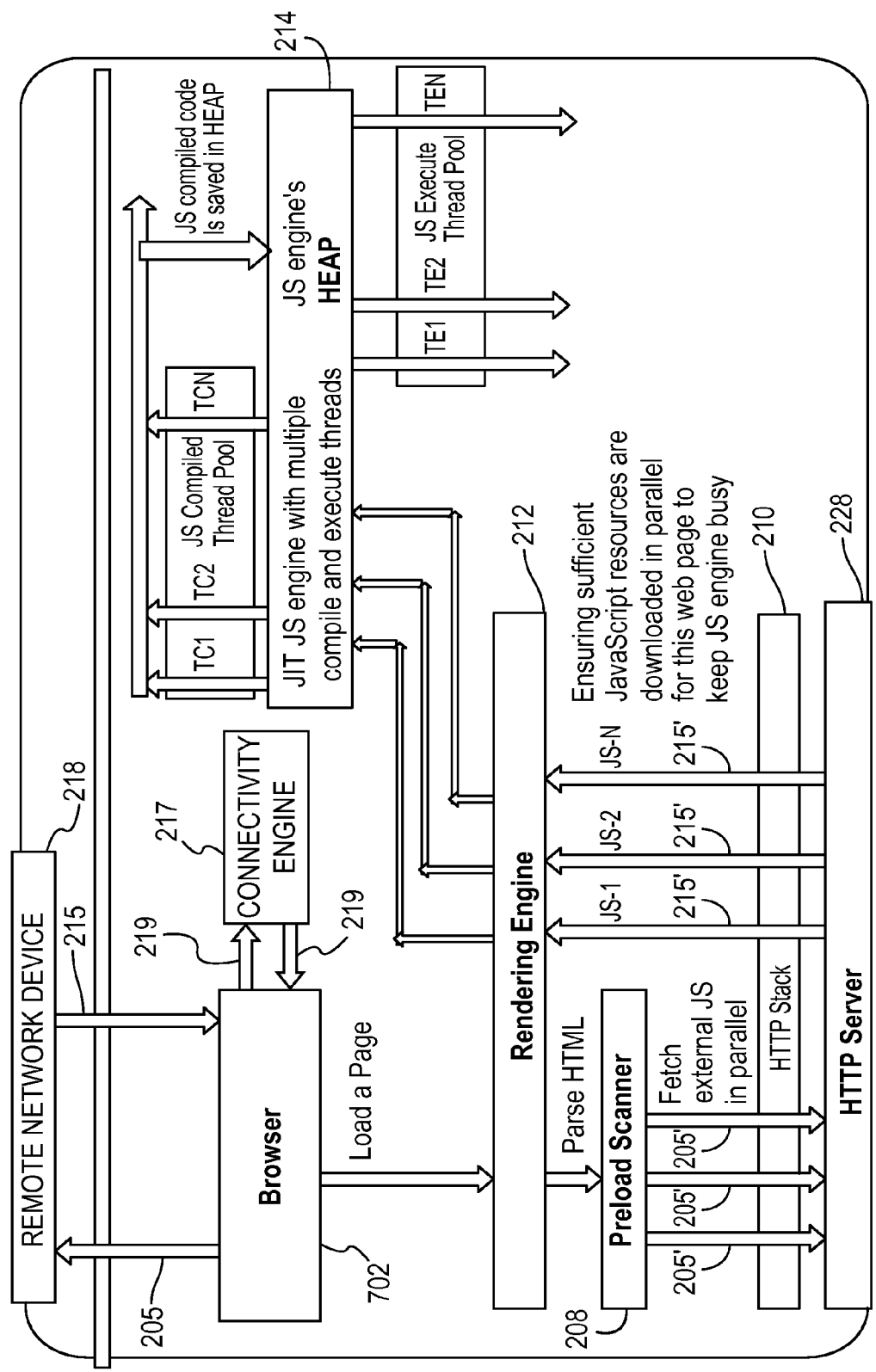
FIG. 2 illustrates a communication of components of a computing device including a web browser.

In an embodiment where at least one of the one or more applications 102 comprises a web browser (as well as in other embodiments where one of the one or more applications 102 does not comprise a web browser, but comprises a different application utilizing JavaScripts), the application/web browser may receive a base-level object comprising a HTML file, a manifest or other file type. For example, as seen in FIGS. 1 and 2, a user of the computing device 100 may request 205 to receive the HTML file through requesting to view a website through an application 102 comprising a browser 202. The request 205 may be sent to one or more remote network hosts 218 and the one or more remote network hosts 218 may send 215 the base-level object to the browser 202. For ease of display, the browser 202 is shown as separate from a rendering engine 212, preload scanner 208, HTTP stack 210, JavaScript engine 214, and connectivity engine 217 in FIG. 2; however, each of the rendering engine 212, preload scanner 208, HTTP stack 210, JavaScript engine 214, and connectivity engine 217 may comprise a portion of the web browser 202 in one embodiment. Therefore, it is contemplated that throughout the specification, when the term web browser 202 or browser 202 is used, one or more other communication component such as, but not limited to, the rendering engine 212, preload scanner 208, HTTP stack 210, JavaScript engine 214, and connectivity engine 217 may be substituted, where appropriate—and vice versa.

In processing the HTML code comprising the base-level website object, the application 102 may encounter inline JavaScripts—JavaScripts referenced in the HTML code itself, and embedded JavaScripts—JavaScripts that are referenced in, for example, an object referenced in the HTML code. Additional object layers are contemplated—for example, one of more embedded JavaScripts may be referenced in a JavaScript or other object that is referenced in an object referenced in the HTML code. Multiple requests 205 to the same or other remote network hosts 218 may be sent for the JavaScripts, and the remote network hosts 218 may send 215 the JavaScripts to the computing device 100. As described below, at least a portion of the inline and embedded JavaScripts may be compiled simultaneously, in-parallel. For example, simultaneous compilation of the received JavaScripts may occur using a thread pool.

Returning now to FIG. 1, FIG. 1 also shows that the computing device 100 may comprise a speculative parser 108, a network stack 110, a rendering engine 112 such as, but not limited to, WebKit, a JavaScript engine 114, and a connectivity engine 117. As seen, the speculative parser 108, rendering engine 112, and JavaScript engine 114 may all be stored in the memory components 104, with a portion of the memory components 104 comprising software in one embodiment. Furthermore, although the network stack 110 is seen as separate from the memory components 104, the network stack 110 may be associated with and/or may be partially stored on the memory components 104. The network stack 110 may also use a wireless network transmitter/receiver 116 in sending the requests 205 and receiving the sent 215 data such as, but not limited to, receiving the JavaScripts from the remote network device 218.

In one computing device 100, upon receiving the HTML base-level object, the HTML file may be parsed and the references to the JavaScripts may be extracted from the file. For example, upon receiving the HTML file (or other file type) from a website host, which may be referred to as a host device, comprising a remote network device 218, the application 202—such as, but not limited to, the web browser, may pass the HTML to the rendering engine 212, which may call the speculative parser such as, but not limited to, a preload scanner 208. The preload scanner may scan the HTML file received from the remote network device 218 and determine the external JavaScripts referenced in the HTML file for the purpose of filling a JavaScript compilation task queue as early as possible. Other methods and mechanisms that are known in the art which are adapted to determine the JavaScripts referenced in the base-level object are also contemplated.

Upon determining the plurality of JavaScripts in the HTML file, the JavaScripts may be passed to the network stack 210 for preferential downloading of the JavaScripts before other file types are downloaded from the network. The network stack 210 may also be referred to as a HTTP stack. It is contemplated that throughout the application where the term JavaScript is used, a JavaScript identifier may be employed. For example, it may not be the actual JavaScript which is passed to the network stack, but an identifier adapted to allow the computing device 100 to request the JavaScript.

Figure 4:
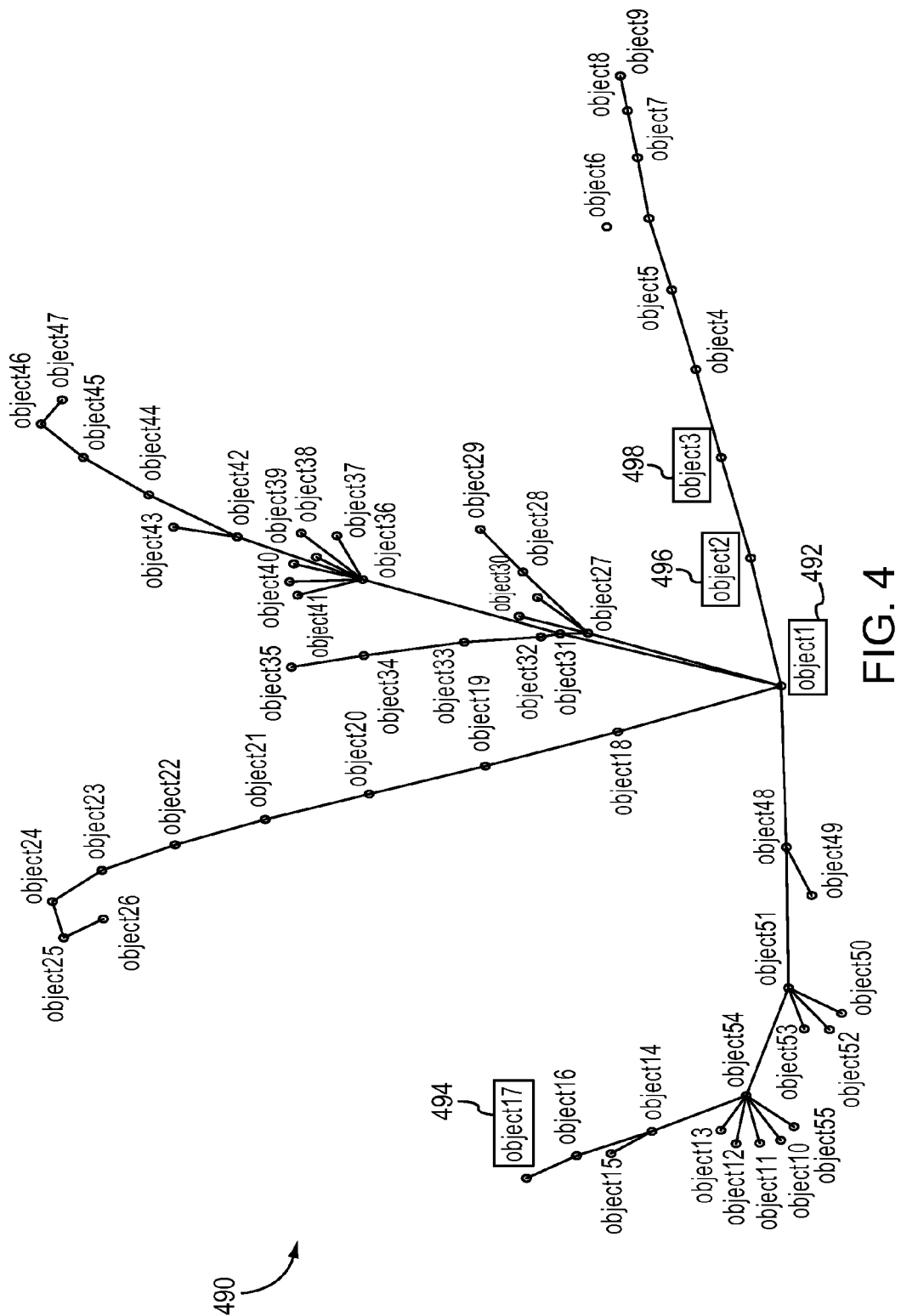
FIG. 4 illustrates a graphical display of a dependency graph.

In one embodiment, the preferential request 205' for the plurality of JavaScripts from a JavaScript host may be sent prior to requesting the other file types such as images or plug-ins, even though the images or plug-ins may be encountered by the rendering engine 212 in the HTML file prior to encountering the plurality of JavaScripts. The JavaScript host such as the HTTP server 228 may also be referred to as a remote host device or remote network device, where appropriate. Such preferential requests 205' and subsequent receipt and downloading of JavaScripts sent 215' from the HTTP server 228 may occur through establishing a plurality of parallel connections to one or more remote network hosts 218 providing the plurality of JavaScripts. Upon receiving the requested JavaScripts from the one or more HTTP servers 228, the network stack 210 may pass the JavaScripts to the rendering engine 212. The rendering engine 212 may pass the JavaScripts to the JavaScript engine 214 when the JavaScript engine 214 is ready for compilation and/or execution of a JavaScript. One JavaScript engine 214 may comprise a JIT JS engine. It is contemplated that in order for the simultaneous compilation and/or execution of JavaScripts to occur by the JavaScript engine 214, JavaScripts should be ready to supply to the JavaScript engine 214—hence, the priority in requesting and receiving the JavaScripts before other website object types. In order to obtain as quick of a loading time as possible by maximizing the benefit from parallel compilation and execution of available JavaScripts, one embodiment may use a dependency graph to detect compliable JavaScripts and may use the preload scanner for fetching additional and potentially more critical JavaScripts. In one embodiment, the JavaScripts fetched with the preload scanner (or any other speculative parser) may comprise a first portion of JavaScripts, while the JavaScripts detected with the dependency graph may comprise a second portion of JavaScripts. It is contemplated that throughout the specification, where the terms "first portion of JavaScripts", "second portion of JavaScripts", "first JavaScript", and/or "second JavaScript" is used, any other of the terms first portion of JavaScripts", "second portion of JavaScripts", "first JavaScript", and/or "second JavaScript" may be used in its place, where appropriate Varying criteria may be applied to the dependency graph in order to determine an order in which the scripts should be preloaded and compiled, including both serial and parallel processing. For example, the dependency graph may use a critical path in the dependency graph or may use a weighted path in the dependency graph to determine the order of preloading and compiling of JavaScripts. As discussed below, seen in FIG. 4 is one graphical representation of a dependency graph 490.

In one embodiment, the HTML file, or other base-level object, received at the computing device 100 comprises a plurality of frames. Frames may also be referred to as framesets. Additionally, though the term frames is used herein throughout the application, it is also contemplated that the features of the application relating to frames may also relate to other similar feature such as, but not limited to, XFrames, server-side includes and PHP scripting languages, where appropriate. In one such embodiment, the rendering engine 212 may create a separate document object model (DOM) for each of the plurality of frames in-parallel. Furthermore, JavaScripts may be hosted on a plurality of different remote network hosts 218. Simultaneously compiling and executing at least a portion of these plurality of JavaScripts may comprise executing at least a portion of one JavaScript from a first of the plurality of frames at substantially the same time as compiling at least a portion of one JavaScript from a second of the plurality of frames. For example, at least one JavaScript from a first frame may be executed in parallel with compiling at least one JavaScript from second frame. Also, at least a portion one JavaScript from a first of the plurality of remote devices may be executed at substantially the same time as executing at least a portion of one JavaScript from a second of the plurality of remote devices.

Figure 3:
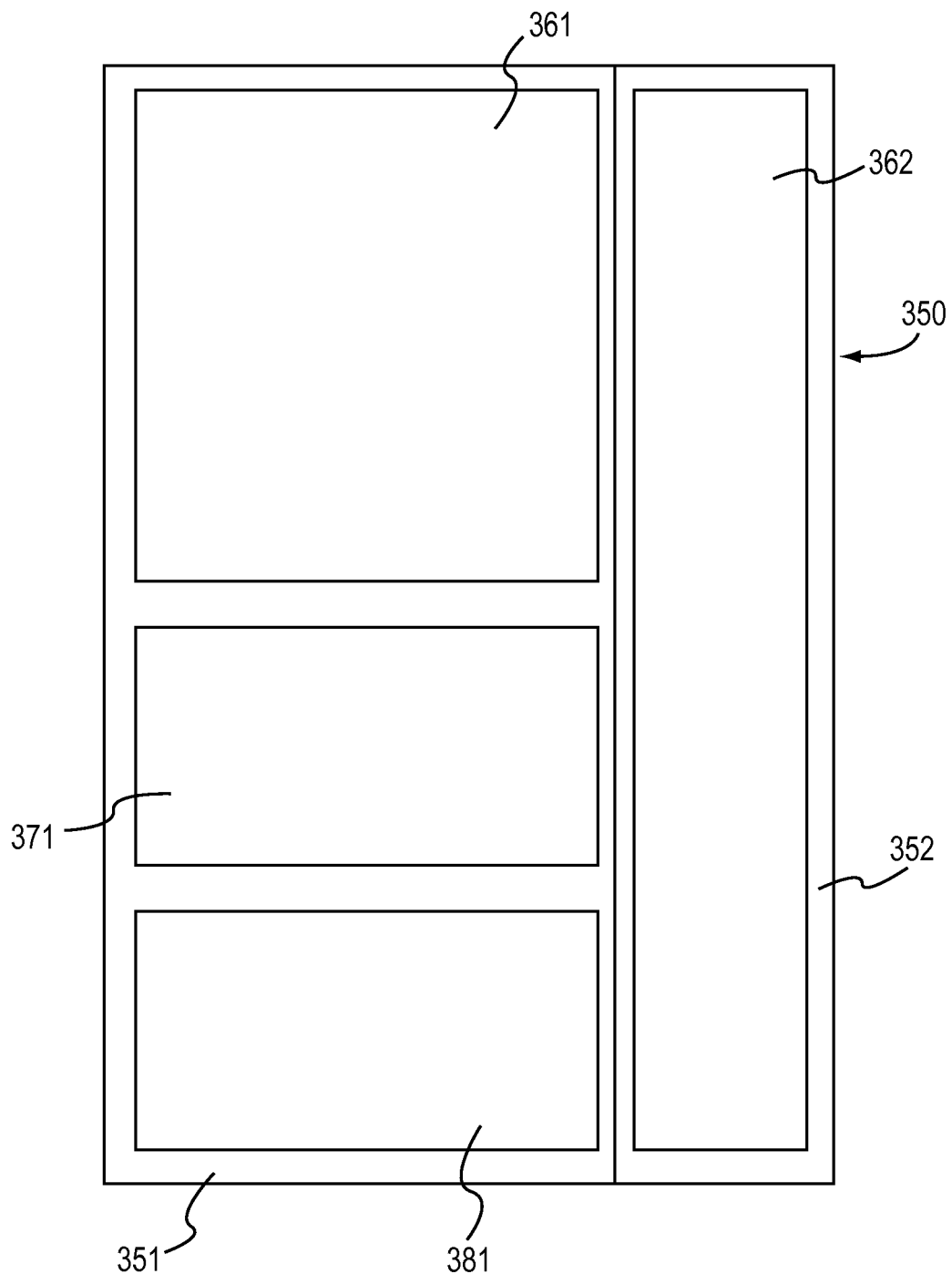
FIG. 3 illustrates a web page having a plurality of frames.

For example, seen in FIG. 3 is a web page 350 comprising a first frame 351 and a second frame 352. The first frame 351 may comprise a first frame first JavaScript 361, a first frame second JavaScript 371, and a first frame third JavaScript 381. The first frame second JavaScript 371 and first frame third JavaScript 381 may be hosted by different remote network hosts 218. The second frame 352 may comprise a second frame first JavaScript 362. In such an embodiment, at least a portion of the first frame first JavaScript 361 may be executed at the same time as the second frame first JavaScript 362. Furthermore, the first frame second JavaScript 371 may be executed at substantially the same time as the first frame third JavaScript 381. Additional frames comprising a plurality of JavaScripts are contemplated.

In one embodiment, upon receiving data from a remote network host 218, such as, but not limited to, receiving data comprising a website from a website host, the computing device 100 may create and cache a dependency graph of the data. Alternatively, the dependency graph may be provided in a manifest file from a content server hosting the website or another server. So, the dependency graph may be cached either by local manifest file on the computing device 100 or the dependency graph may be received from a server via a manifest file. The server may also send a compressed resource package comprising the pluralilty of JavaScripts. Such a compressed resource package may reduce the number of necessary network transactions to download the plurality of JavaScripts and therefore reduces overall network delay to load a webpage. Seen in FIG. 4 is one graphical representation of a dependency graph 490. The dependency graph 490 shows a base-level object1 492 and additional objects comprising the website. One dependency graph 490 may be analyzed to determine leaf node JavaScripts in order to schedule at least one of a higher request priority and a compilation priority for the leaf node JavaScripts as compared to non-leaf node JavaScripts. For example, object17 494 may comprise a leaf-node JavaScript while object2 496 may comprise a non-leaf node JavaScript. In one embodiment, the computing device 100 may do at least one of (i) request 205 object17 494 before object2 496 and (ii) compile object17 494 before object2 496. Different levels of detail may be designated as optional in the cached dependency graph 490. For example, JavaScripts may be identified that are less likely to be executed, since not all JavaScripts are executed each time a web page is downloaded. Therefore, a cached dependency graph 490 may contain details like the most commonly executed JavaScripts, thus helping to reduce extreme speculative compilation that can lead to power wastage. It is also contemplated to use the dependency graph 490 to schedule a higher compilation priority for a dependent JavaScript than for a non-dependent JavaScript. For example, object3 498 may be a JavaScript dependent on the object2 496 JavaScript. In such an embodiment, the object3 496 JavaScript may be compiled prior to the object2 496 JavaScript.

Other than leaf node criteria, additional criteria may determine the priority of requesting the objects comprising the website. For example, criteria such as, but not limited to, an estimated download time of an object may be used to determine the priority of requesting the objects. Such an estimated download time may be based on the file sizes. Such estimated down load time and file size information may be obtained from the cached dependency graph 490, whose information may be cached on the computing device 100, based on previous visits by the computing device 100 to the same website. It is also contemplated that the dependency graph 490 and associated information may be cached on different device such as, but not limited to, a cache server.

Another criteria used in determining the priority of requesting objects may be access latency. In one embodiment, while estimating the download time for the objects, or determining other criteria used in obtaining the priority of object requests, the computing device 100 may also consider the access latency from the remote domain where the JavaScripts are hosted, which may also include estimating the network bandwidth to the remote domain.

In one embodiment, the connectivity engine 217 may provide network-related information, such as, but not limited to, an estimated bandwidth and access latency, to the browser 202 through a connectivity communication 219. The browser 202 or other communication component may use the network-related information, and any other information received from the dependency graph 490 or elsewhere to estimate a network delay associated with downloading the objects. The network delay may be then used to determine the priority of network requests 205. In one embodiment, the connectivity engine 217 may be configured to receive network-related information (e.g., reverse link rate and round trip time) from a modem that resides on mobile computing device 100 through a connectivity communication 219. Creation and use of a dependency graph 490 such as, but not limited to, the dependency graph 490 seen in FIG. 4, is described in pending U.S. patent application Ser. No. 12/971,315, entitled METHOD AND APPARATUS FOR RECEIVING DISPLAY LIMITED WEB PAGE CONTENT. The Ser. No. 12/971,315 application is hereby incorporated by reference for all valid purposes.

Figure 5:
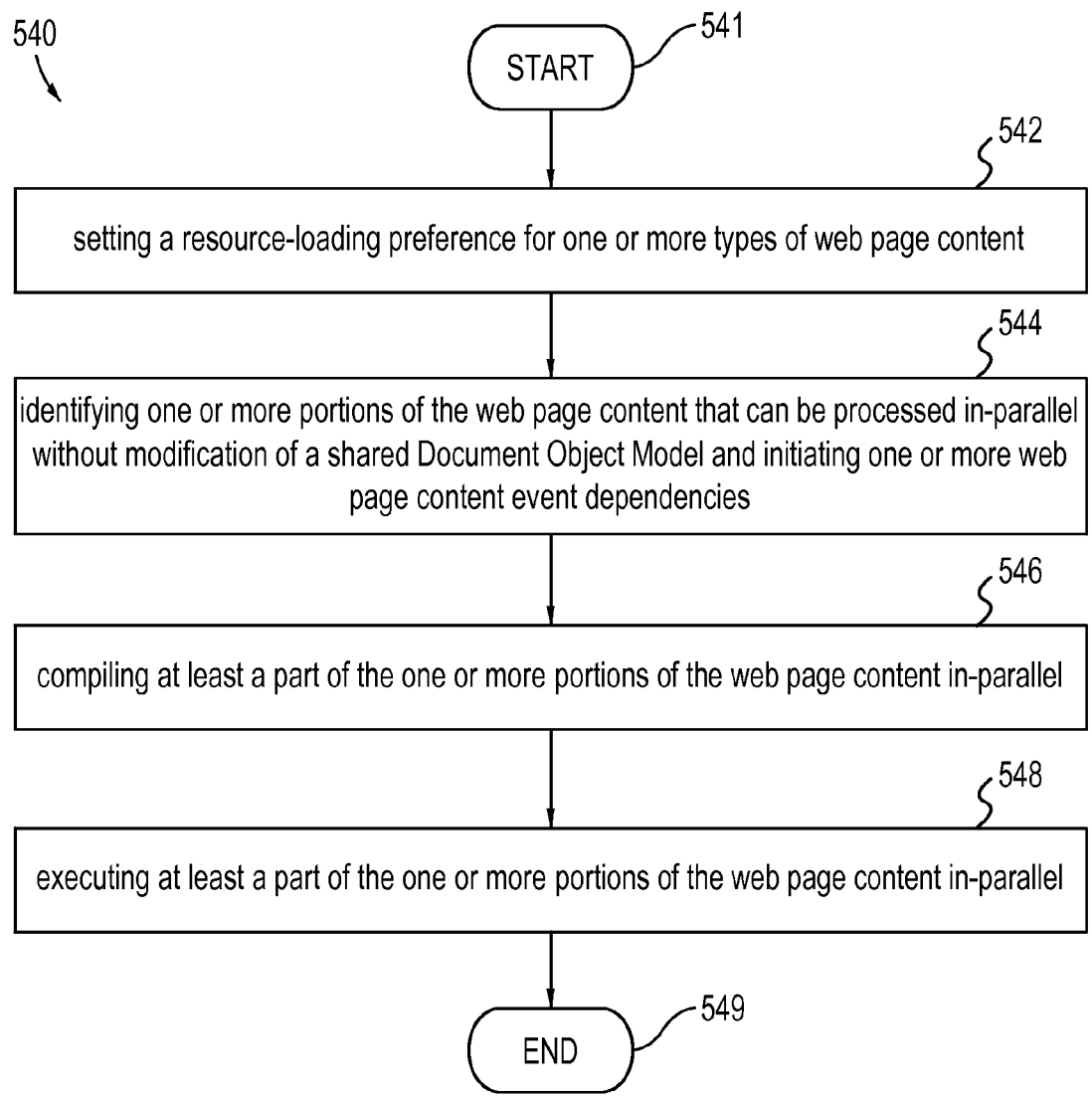
FIG. 5 illustrates a flowchart that depicts a method that may be carried out in connection with the embodiments described herein.

FIG. 5 illustrates a method 540 of processing web page content. One method 540 of processing web page content starts at 541 and at 542 comprises setting a resource-loading preference for one or more types of web page content. For example, the one or more types of web page content may comprise a plurality of JavaScripts and setting a resource-loading preference for the plurality of JavaScripts may comprise setting a preference for requesting to receive the plurality of JavaScripts before requesting to receive one or more other object types comprising the web page content. In one embodiment, setting a resource-loading preference may comprise using the information obtained from the connectivity engine 217, dependency graph 490, and elsewhere, to establish an object request sequence. It is also contemplated that the sequence may establish a preference for receiving particular objects of the same object type. The resource-loading preference may also be referred to as criteria, while the sequence may be referred to as an order throughout the specification.

At 544 the method 540 comprises identifying one or more portions of the web page content that can be processed in-parallel without at least one of (i) modification of a shared Document Object Model, and (ii) initiating one or more web page content event dependencies. For example, the one or more portions of the web page content may be preemptively identified prior to requesting the content. In one embodiment, JavaScripts from different HTML frames and/or JavaScripts hosted by different HTTP Servers 228 may be identified as a portion of web page content that can be executed in-parallel without (i) modification of a shared Document Object Model, and (ii) affecting a dependency of the web page content. Separate DOMs may be created for (i) JavaScripts from different frames and (ii) JavaScripts hosted on separate HTTP Servers 228 but inside the same frame—which may not be dependent upon one another, as per the security specification of JavaScripts. In one embodiment, a first document object model may be created for a first frame and a different, or second, document object model may be created for the second frame.

At 546, the method 540 comprises compiling a portion of the web page content in-parallel, while at 548, the method comprises executing a portion of the web page content in-parallel. For example, any two JavaScripts in the web page may be compiled in-parallel since compilation of different JavaScripts is not dependent on each other and is not going to access or modify the DOM or any other shared data structure or entity. In one method 540, compiling a portion of the web page in-parallel comprises performing a compilation of a speculative JavaScript in-parallel with a compilation of a non-speculative JavaScript. Speculative JavaScripts are generally not compiled in-parallel. A speculative compilation of a JavaScript is typically scheduled in parallel with a non-speculative compilation of a JavaScript. Furthermore, typically only non-speculative in-parallel execution of JavaScripts occurs for JavaScripts in different frames and/or for JavaScripts hosted by different remote network host 218. By parallel non-speculative execution of JavaScripts from different frames, the progress of the rendering of the individual frames is performed at least partly simultaneously, rather than rendering each frame sequentially. It should be noted that taken into consideration in any embodiment may be whether a JavaScript in a one frame triggers an event in a different frame, potentially triggering a different control path in each frame, and thus potentially changing the list of scripts that should be executed. The method ends at 549.

One embodiment may also comprise a computing system. One computing system may comprise the computing device 100 seen in FIG. 1. The computing system may comprise means for requesting external JavaScripts in-parallel. For example, as seen in FIG. 2, a plurality of preferential requests 205' may be sent for a plurality of JavaScripts located on a remote network host 218 upon speculatively parsing a base-level object such as, but not limited to, a HTML object, for JavaScripts.

Upon receiving the plurality of JavaScripts, the computing system may further comprise compiling the plurality of JavaScripts in-parallel. For example, the computing device 100 may use a JavaScript engine 214 comprising a JIT compiler to compile the plurality of JavaScripts, where the JavaScripts may be provided to the JavaScript engine 214 & compiler from the rendering engine 212. Compilation of any one JavaScript—such as, but not limited to, a first JavaScript, is independent of a compilation of any other JavaScript—such as, but not limited to, a second JavaScript. Therefore, compilation of all JavaScripts are independent of each other and do not lead to DOM read/writes. Upon compilation of one or more of the plurality of JavaScripts, one computing system comprises means for executing the JavaScripts in-parallel. For example, a first JavaScript hosted by a first remote network host 218 may be executed with a JavaScript hosted by a second remote network host 218 different from the first remote network host 218. It is contemplated that a first remote network host 218 may be different form a second remote network host 218 when a domain of the two devices differs, a protocol used to communicate with the devices differs, and/or the port communication with the devices differs. It is further contemplated that a change in the protocol used to communicate with the remote network host 218 may enable the creation of additional different remote network hosts 218 in the future. For example, a change in rules regarding DOM sharing among JavaScripts may enable additional JavaScripts to be processed, executed, and compiled in-parallel.

Upon downloading a plurality of JavaScripts, in one embodiment, a computing device 100 and/or a computing system may not perform multiple speculative compiles in-parallel, to avoid the case where none of the speculative compiles are ever executed—leading to wasting processing time and operation when the speculative JavaScripts are never executed. Therefore, compiling the JavaScripts in-parallel may comprise compiling a speculative JavaScript in-parallel with a non-speculative JavaScript, thus avoiding entirely wasting processing time and operation and ensuring that some useful work is always performed. Although compiling speculative JavaScripts may account for some wastage of processing time and operation for JavaScripts that are never executed, such waste is generally limited to compilation energy and does not block a processor core or actually waste overall processing time for the web page or other application. For example, if the overall system load is low or if the JavaScripts are sequentially executed, there is a possibility that one of the cores will be lying idle, and such speculative compilation of JavaScripts should not take up core processor time or block a core processor from completing other tasks since no other tasks may be available to process. Therefore, speculative compilation of JavaScripts should generally reduce the overall load time of a web page and/or reduce the completion time of other applications using JavaScripts.

In one embodiment, non-speculative execution of multiple JavaScripts occurs in-parallel. For example, each frame of a web page may be rendered simultaneously through parallel non-speculative execution of JavaScripts from the different frames. However, in such an embodiment, the scheduled execution of JavaScripts may be dynamic and subject to change. For example, a JavaScript in the first frame 351 seen in FIG. 3 may trigger an additional event in the second frame 352. The additional second frame event may comprise one or more additional second frame JavaScripts. In such a case, the scheduled execution of second frame JavaScripts may be modified to include the execution of the additional second frame JavaScripts before, in-parallel with, or at the end of executing any other pending second frame JavaScripts. The priority can be a function of several factors including, for example, the proximity of the cursor or the computing device viewport to any uncompiled JavaScript objects.

It is also contemplated that one embodiment may comprise a non-transitory, tangible computer readable storage medium, encoded with processor readable instructions to perform a method of displaying a web page on an electronic display. For example, the non-transitory, tangible computer readable storage medium may comprise at least a portion of the memory components 104, as seen in FIG. 1. Additionally, one electronic display may comprise the electronic display 106 seen in FIG. 1. One method of displaying a web page on the electronic display 106 comprises requesting to view a HTML file via a web browser. The method then comprises parsing the HTML file, where the HTML file references one or more JavaScripts and a plurality of additional objects.

The non-transitory, tangible computer readable storage medium, encoded with processor readable instructions may further comprise the method steps of preferentially requesting to receive the one or more JavaScripts prior to requesting to receive at least a portion of the plurality of additional objects, compiling at least a portion of at least two of the one or more JavaScripts in-parallel, executing at least a portion of at least two of the one or more JavaScripts in-parallel, and displaying the web page on the electronic display 106. In one embodiment, the one or more JavaScripts comprise two or more JavaScripts. It is contemplated that at least one of the one or more JavaScripts may reference one or more JavaScripts. Furthermore, a plurality of external JavaScripts may be fetched in-parallel. For example, in parsing and fetching the one or more JavaScripts, two JavaScripts hosted by separate web site hosts, respectively, may be fetched substantially simultaneously. In one embodiment, executing a plurality of the one or more JavaScripts in-parallel may comprise determining whether any of the one or more JavaScripts is dependent upon any other of the one or more JavaScripts. Additionally, the JavaScript compiled code may be saved in the JavaScript engine's HEAP comprising JIT code.

In one or more exemplary embodiments, the functions described may be implemented in hardware, software, firmware, or any combination thereof. If implemented in software or firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In conclusion, embodiments of the present invention increases application performance on a computing device. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:
1. A computing device comprising,
   an application utilizing content comprising a plurality of JavaScripts;
   a speculative parser;
   a network stack;
   a rendering engine;
   a JavaScript engine; and
   a dependency graph; wherein the computing device,
      compiles a first of the plurality of JavaScripts simultaneously as compiling a second of the plurality of JavaScripts, and
      is adapted to,
         receive a HTML file comprising the plurality of JavaScripts and other content types,
         extract a first portion of the plurality of JavaScripts with the speculative parser,
         extracting a second portion of the plurality of JavaScripts with the dependency graph,
         use the network stack to, open a plurality of parallel connections to one or more host devices,
preferentially download the plurality of JavaScripts from the one or more host devices before downloading the other content types, and
supply the plurality of JavaScripts from the rendering engine to the JavaScript engine.

2. The computing device of claim 1 wherein, at least a portion of the content comprising a plurality of JavaScripts is provided from a compressed resource package provided from a remote network host.

3. The computing device of claim 1 wherein,
the plurality of JavaScripts comprise inline JavaScripts and embedded JavaScripts referenced in a base-level website object; and
a thread pool is used to simultaneously compile,
the first of the plurality of JavaScripts, and
the second of the plurality of JavaScripts.

4. The computing device of claim 1 wherein, the dependency graph is provided from one of,
a local manifest file; and
a manifest file received from at least one remote network host.

5. The computing device of claim 1 wherein, wherein the computing device is further adapted to,
use one or more criteria to determine an order of downloading and compiling the plurality of Javascripts, wherein the one or more criteria comprise,
a critical path;
a weighted path;
whether a JavaScript comprises a leaf node;
an estimated download time;
a file size;
access latency;
a network delay;
reverse link rate; and
round trip time.

6. The computing device of claim 1 wherein,
the HTML file further comprises a plurality of frames;
the first of the plurality of JavaScripts comprises a first JavaScript located in a first of the plurality of frames;
the second of the plurality of JavaScripts comprises a second JavaScript located in a second of the plurality of frames; and further comprising,
a separate document object model for each of the plurality of frames, the separate document object model for each of the plurality of frames being created by the rendering engine; and wherein, at least a portion of the first JavaScript is executed in-parallel as at least a portion of the second JavaScript.

7. The computing device of claim 1 wherein,
the first of the plurality of JavaScripts is hosted on a first remote network host;
the second of the plurality of JavaScripts is hosted on a second remote network host, the second remote network host being different than the first remote network host; and
at least a portion of the first JavaScript is executed in-parallel as at least a portion of the second JavaScript.

8. The computing device of claim 7 wherein, the second remote network host being different than the first remote network host when at least one of,
a domain of the first remote network host differs from a domain of a second remote network host;
a communication protocol between the computing device and the first remote network host differs from a communication protocol between the computing device and the second remote network host; and
a port used to communicate between the first remote network host and the computing device differs from a port used to communicate between a second remote network host and the computing device.

9. The computing device of claim 1 further comprising, a cached dependency graph; and wherein, compiles a first of the plurality of JavaScripts simultaneously as compiling a second of the plurality of JavaScripts comprises,
using the cached dependency graph to determine dependencies among JavaScripts and find leaf node JavaScripts; and one of,
scheduling a compilation priority for leaf node JavaScripts and non-leaf node JavaScripts, wherein the leaf node JavaScripts are scheduled for compilation before the non-leaf non JavaScripts; and
scheduling a compilation priority for a dependent JavaScript and a non-dependent JavaScript, wherein the dependent JavaScript is scheduled for compilation before the non-dependent JavaScript.

10. The computing device of claim 9 further comprising using the cached dependency graph to at least one of download and prefetch expired resources.

11. The computing device of claim 1 wherein the computing device executes a first of the plurality of JavaScripts simultaneously as executing a second of the plurality of JavaScripts.

12. A method of processing a web page comprising,
receiving a HTML file comprising a plurality of JavaScripts and one or more other types of web page content;
parsing the HTML file with a speculative parser;
extracting a first portion of the plurality of JavaScripts from the HTML file with a speculative parser;
extracting a second portion of the plurality of JavaScripts from the HTML file with a dependency graph;
setting a resource-loading preference for the one or more other types of web page content;
identifying one or more portions of the web page content that can be processed in-parallel without at least one of,
modification of a shared Document Object Model, and
initiating one or more web page content event dependencies;
using a network stack to open a plurality of parallel connections to one or more host devices;
preferentially downloading the plurality of JavaScripts from the one or more host devices before downloading the one or more other types of web page content;
supplying the plurality of JavaScripts from a rendering engine to a JavaScript engine;
compiling at least a part of the one or more portions of the web page content in-parallel; and
executing at least a part of the one or more portions of the web page content in-parallel.

13. The method of claim 12 wherein, the one or more types of web page content comprises a plurality of JavaScripts.

14. The method of claim 12 wherein identifying at least a portion of the web page content that can be processed in-parallel comprises,
parsing a base-level web page object;
finding a first JavaScript and a second JavaScript; and
downloading the first JavaScript in parallel with the second JavaScript.

15. The method of claim 12 wherein, setting a resource-loading preference for one or more types of web page content comprises using at least one of;
a critical path;

a weighted path;
whether a JavaScript comprises a leaf node;
an estimated download time;
a file size;
access latency;
a network delay;
reverse link rate; and
round trip time.

16. The method of claim 15, wherein, at least one of, the critical path, the weighted path, whether a JavaScript comprises a leaf node, the estimated download time, the file size, the access latency, the network delay, the reverse link rate, and the round trip time is determined from the dependency graph.

17. The method of claim 12 wherein,
the web page content comprises a HTML file comprising a plurality of frames;
compiling a portion of the web page in-parallel comprises performing a speculative compilation in-parallel with a non-speculative compilation; and
executing a portion of the web page content in-parallel comprises executing web page content comprising a first frame of the plurality of frames in parallel with executing web page content comprising a second frame of the plurality of frames.

18. The method of claim 17 wherein executing web page content comprising a first frame of the plurality of frames in parallel with executing web page content comprising a second frame of the plurality of frames comprises,
parsing the HTML of the first frame of the plurality of frames;
parsing the HTML of the second frame of the plurality of frames;
creating a first document object model for the first frame; and
creating a second document object model for the second frame, wherein the second document object model is different than the first document object model.

19. A non-transitory, tangible computer readable storage medium, encoded with processor readable instructions to perform a method of executing JavaScripts comprising,
means for receiving a HTML file comprising a plurality of JavaScripts and other content types;
means for parsing the HTML file with a speculative parser;
means for extracting a first portion of the plurality of JavaScripts from the HTML file with a speculative parser;
means for extracting a second portion of the plurality of JavaScripts from the HTML file with a dependency graph;
means for using a network stack to open a plurality of parallel connections to one or more host devices;
means for requesting external JavaScripts in-parallel;
means for preferentially downloading the plurality of JavaScripts from the one or more host devices before downloading the one or more other types of web page content;
supplying the plurality of JavaScripts from a rendering engine to a JavaScript engine;
means for compiling the JavaScripts in-parallel; and
means for executing the JavaScripts in-parallel.

20. The non-transitory, tangible computer readable storage medium of claim 19 wherein, means for requesting external JavaScripts in-parallel comprises,
speculatively parsing a HTML file for JavaScripts; and
simultaneously requesting the JavaScripts.

21. The non-transitory, tangible computer readable storage medium of claim 19 wherein, means for compiling the JavaScripts in-parallel comprises,
supplying the JavaScripts to a JavaScript engine from a rendering engine; and
compiling the JavaScripts with the JavaScript engine.

22. non-transitory, tangible computer readable storage medium of claim 19 wherein, means for executing the JavaScripts in-parallel comprises executing a first JavaScript from a first host in-parallel with executing a JavaScript from a second host, wherein the second host is different than the first host.

23. The non-transitory, tangible computer readable storage medium of claim 19 wherein,
means for compiling the JavaScripts in-parallel comprises compiling speculative and non-speculative JavaScripts; and
means for executing the JavaScripts in-parallel comprises executing non-speculative JavaScripts.

24. A non-transitory, tangible computer readable storage medium, encoded with processor readable instructions to perform a method of displaying a web page on an electronic display comprising,
requesting to view a HTML file via a web browser, wherein the HTML file comprises one or more JavaScripts and a plurality of additional objects;
receiving the HTML file;
parsing the HTML file with a speculative parser;
extracting a first portion of the plurality of JavaScripts from the HTML file with a speculative parser;
extracting a second portion of the plurality of JavaScripts from the HTML file with a dependency graph;
using a network stack to open a plurality of parallel connections to one or more host devices;
preferentially requesting to receive the one or more JavaScripts prior to requesting to receive at least a portion of the plurality of additional objects;
supplying the plurality of JavaScripts from a rendering engine to a JavaScript engine;
compiling at least a portion of at least two of the one or more JavaScripts in-parallel;
executing at least a portion of at least two of the one or more JavaScripts in-parallel; and
displaying the web page on the electronic display.

25. The non-transitory, tangible computer readable storage medium of claim 24 wherein at least one of the one or more JavaScripts reference one or more additional JavaScripts.

26. The non-transitory, tangible computer readable storage medium of claim 24 wherein, preferentially requesting to receive the one or more JavaScripts prior to requesting to receive at least a portion of the plurality of additional objects comprises fetching a plurality of external JavaScripts in-parallel.

27. The non-transitory, tangible computer readable storage medium of claim 24 wherein, executing a plurality of the one or more JavaScripts in-parallel comprises executing one or more non-speculative JavaScripts.

28. The non-transitory, tangible computer readable storage medium of claim 24 further comprising, saving JavaScript compiled code in the JavaScript engine's HEAP comprising JIT code, after compiling at least a portion of at least two of the one or more JavaScripts in-parallel.

* * * * *